United States Patent [19]
Nocquet

[11] Patent Number: 5,262,188
[45] Date of Patent: Nov. 16, 1993

[54] FREE WATER REMOVAL FROM MEAT

[75] Inventor: Jacques Nocquet, Helsingborg, Sweden

[73] Assignee: Nestec S.A., Vevey, Switzerland

[21] Appl. No.: 822,365

[22] Filed: Jan. 17, 1992

[30] Foreign Application Priority Data

Apr. 11, 1991 [EP] European Pat. Off. ........ 91105750.3

[51] Int. Cl.⁵ .............................................. A23B 4/10
[52] U.S. Cl. .................................... 426/402; 426/92; 426/103; 426/292; 426/573; 426/578; 426/615; 426/641; 426/642; 426/652
[58] Field of Search ................ 426/92, 289, 103, 292, 426/578, 573, 641, 642, 652, 412, 415, 615, 402

[56] References Cited

U.S. PATENT DOCUMENTS 2,428,495 10/1947 Lesparre et al. ...................... 426/92
3,792,173 2/1974 Glabe ................................... 426/289

OTHER PUBLICATIONS

Specification for U.S. Ser. No. 07/642,413 filed Jan. 17, 1991.

*Primary Examiner*—Helen F. Pratt
*Attorney, Agent, or Firm*—Vogt & O'Donnell

[57] ABSTRACT

Free unbound water is removed from cooked meat by contacting a cooked meat with particulate food-acceptable water-absorbing material to coat the meat. The material is maintained in contact with the meat for at least a time sufficient to remove free unbound water from the meat. The coating containing free unbound water obtained from the meat subsequently may be removed from the meat.

18 Claims, No Drawings

FREE WATER REMOVAL FROM MEAT

BACKGROUND OF THE INVENTION

The present invention relates to treating cooked meat and to a method for removing free, unbound water to avoid visible fluid drip formation in a package containing the meat.

In the manufacture and packaging of cooked meats, a significant problem, particularly with ham meats, is leakage of fluids, in particular free water, from the meat into the package since, it is believed, protein denaturation during cooking reduces the water and fluid holding capacity of the meat. Thus, all of the water contained in a cooked ham, for example, is not bound or immobilized in the product, and if this free unbound water is not allowed to escape or is not somehow removed before packaging, it appears as visible drip in the package. Generally, when the drip exceeds about 0.3% by weight of the total weight of the product, depending, of course, on the package size and measuring method, the visual perception of the product is severely impaired, particularly when marketed in transparent gas-packed packages.

In spite of attempts to increase the water-holding capacity of ham, which include means such as the use only of high quality ham having a pH of from 5.7 to 6.1, or by attempting to effect good salt distribution, efficient tumbling with an injection brine to distribute the brine in the meat, and/or provide optimum thermal treatment, the drip problem is not necessarily reduced. Thus, many packaged products have contained a fluid absorbent material in the package to absorb and contain the drip, which itself is not aesthetically desirable. It also is possible to add polyphosphates, citrates, proteins or carbohydrates to an injection brine to improve the water holding capacity of the product, but such components are either not permitted by food legislation in many countries or they are not desired in high quality meat products marketed as "pure" products.

SUMMARY OF THE INVENTION

In European Patent Application Publication No. 438619 and in co-pending U.S. patent application Ser. No. 07/642,413, now abandoned, a process is disclosed to address the problem of visible drip formation wherein free unbound water is removed from cooked meat with a non-edible water-absorbing material, such as paper sheets or a pad of cellulosic fibers or other natural or synthetic absorbing materials, which is removed together with the free water from the cooked meat before packaging.

The present invention provides a process for removing free unbound water from cooked meat before packaging using a particulate water-absorbing material which has been found to be less costly than employing non-edible materials and which results in decreased waste and disposal problems.

Accordingly, the present invention provides a process for removing free unbound water from cooked meat characterized in that the meat is placed in contact with at least one particulate food-acceptable water-absorbing material to coat the meat to remove free unbound water therefrom, and the material and meat are maintained in contact for at least a time sufficient to remove free unbound water from the meat. After absorption of free unbound water, at least a portion of the coating material containing the free unbound water may be removed from the meat. Preferably, the material is an edible material which may or may not be removed from the meat.

DETAILED DESCRIPTION OF THE INVENTION

The present invention is especially applicable when the meat is a cooked or cured ham or a similar cooked or cured product and also when, in particular, the meat is a marinated product, made from, for example, pork, beef, mutton, turkey, or chicken, e.g., turkey roast, chicken roll, corned beef, etc.

The absorbing material employed should be acceptable for and approved by legislative authorities for meat contact, and particularly, if not edible, the material should be one which does not migrate into the meat during treatment. The particulate material also should not give any off-flavors to the meat nor substantially decrease the shelf-life of the product.

In addition, as exemplified below with an edible water-absorbing material, non-edible food-acceptable particulate materials may be placed in contact with a cooked meat by being encased by a porous material such as a porous plastic film, or by a porous paper or cellulosic protective layer situated between the material and the meat. For aesthetic purposes, and because it has been found that operating in accordance with the present invention substantially obviates the problem of visible drip, the materials and collected fluids are removed from meat before packing, which also eliminates the possibility of leakage of meat fluids from the absorbing material into the package during storage. Thus, as will be appreciated, a variety of food-acceptable water-absorbing and desiccant materials may be employed in this embodiment including, for example, silica gel, calcium chloride glucomannan, sodium acrylate, silicon dioxide and bentonite and equivalents thereof.

Useful in the present invention as absorbing materials are animal and vegetable fibers, starches, gums and proteins.

Animal and vegetable fibers are particularly preferred to be employed in the present invention. Such fibers include oat, wheat, corn, barley, rye, pea and bean fibers, and derivatives and equivalents thereof.

In addition, a variety of starches derived from grains, tubers and roots may be employed. Such starches include potato, corn, wheat, tapioca and rice starches and derivatives and equivalents thereof, and the starches may be pregelatinized.

Gums include, for example, alginates, carragaenan, and guar gum and derivatives and equivalents thereof. Gelatin also may be employed.

The particulate absorbing material preferably is in a finely divided particulate form, such as a powder, especially a fine powder, and preferably, the material has a mean particle size of from about 0.01 mm to about 0.05 mm.

The amount of absorbing material coated on the meat is, at a minimum, an amount sufficient to absorb the quantity of free water present in the meat, and may be from about 0.25% to about 10% and preferably from about 0.5% to about 5% by weight based on the weight of the meat.

Conveniently, the meat is coated with the absorbing material after cooking such as by dusting the particulate material on the surface of the cooked meat, such as by hand or with sifters or with various particulate distributing devices employed by those skilled in food coating arts to coat various particulate materials on foods to effect a coating of the material on the meat distributed substantially evenly over the surface of the meat.

Advantageously, the meat to which the material has been applied to coat it is vacuum packed in a pack to create and assist in providing intimate contact between the absorbing material and the meat by exerting a pressure which assists coating adherence and water extraction from the meat to the material.

Also advantageous, whether vacuum packed or not, is chilling the coated meat to at least a refrigeration temperature for storage while the free water migrates from the meat to the absorbing material, which may range from a few minutes to several days, such as from 15 minutes to 2 days. Preferably, a chilled storage temperature is a temperature of from about $-10°$ C. to about $10°$ C., preferably from about $-5°$ C. to about $6°$ C.

Depending on the absorbing material employed, it may be useful, whether the coated meat has been chilled or not, to heat the coated meat for a time and at a temperature sufficient to induce swelling of the absorbing material and at the same time obtain a surface pasteurization of the product. Such heating may be carried out for a period of from about 1 min to about 120 mins, preferably for from about 2 mins to about 90 mins and at known pasteurization temperatures. The heated product is advantageously then again chilled to at least a refrigeration temperature, these steps having been found to facilitate removal of the coating by such as peeling, or scraping, if necessary.

When vacuum packed in a pack for treatment, it is desirable to remove the meat from the pack and repack it in a pack, preferably in a gas-packed modified atmosphere. Although the coating material also may be removed from the meat, it may not be necessary to remove the coating material and its collected fluids if it is edible and acceptable as an ingredient in the finished product. In fact, it may be advantageous not to remove the coating material before final packing if, in addition to being edible and acceptable, it is not particularly noticeable after treatment, such as is the case generally after a heating or surface pasteurization as described above, or if the coating is configured or designed as a decoration for the product, e.g., a flavored and/or colored coating about the product.

The process of the present invention may be applied to any meat produced by conventional cooking technologies including what is known as a "cooked-in" method.

In a preferred embodiment of the invention, before cooking, fresh meat is cut and trimmed, injected with brine and/or a marinade and tumbled at a temperature of about $6°$ C. and below while allowing at least 24 hours holding (interval tumbling and resting) between injection and cooking to obtain good salt and/or marinade distribution. The cooking may be carried out in a mold or a casing after which the meat is mixed to contact with the water-absorbing material and vacuum packed in a pack and then chilled. After chilling the meat may be removed from the pack and if desired, the absorbing material is removed from the meat. The meat may be packed in a pack whole or sliced and is preferably gas packed in a modified atmosphere and the treated meat may be vacuum packed.

EXAMPLES

The following Examples further illustrate the present invention.

EXAMPLE I

A brine solution having the composition given in the Table below is injected with a GAROS multineedle injector into trimmed fresh hams having a pH of 5.6 in an amount of 75 g/kg ham.

TABLE

|  | % |
| --- | --- |
| Water | 70.3 |
| Curing salt | 22.9 |
| Saccharose | 3.4 |
| Ascorbate | 0.4 |

The injected ham is loaded in a SCHEID 100 vacuum tumbler, and salt, in an amount of 0.5 g/kg ham, is added. Then, the meat is tumbled for 40 hours at $2°$ C. using an interval program of tumbling and resting.

The tumbled ham is removed from the tumbler and packed in "cook-in" bags, which then are vacuum sealed and placed in a mold to shape the product.

Cooking of the ham in the bags is carried out stepwise as follows:
1) $62°$ C. cooking chamber temperature to $55°$ C. core temperature; and then,
2) $74°$ C. cooking chamber temperature to $68°$ C. core temperature.

The bags are cooled with a water shower for 30 min. and then placed in a cooler at $5°$ C. for 20 hrs.

After removal from the cooler, the bags are opened to drain, and the drained cooked products are weighed.

Each cooked ham then is coated with potato starch in an amount of 4% by weight based upon the weight of the ham and is packed in a pack and vacuum sealed. The packed ham is stored at $5°$ C. for 24 hours.

The stored ham then is warmed in an oven at $85°$ C. chamber temperature for 4 minutes to swell the starch coating and to provide surface pasteurization. The heated product then is chilled in a brine tank at $-5°$ C. for 30 minutes.

The chilled ham is removed from the pack, and the gelled starch is removed from the ham, after which the cooked ham is sliced and gas-packed in a pack.

By treatment in accordance with the invention, 6% moisture is removed from the cooked ham before slicing and packing. The final gas-packed packs are free from visible drip. The measured drip averages 0.45% (w/w) which compares to 2.5% (w/w) for a reference product which is treated in the same way except it is not provided with the coating of potato starch.

EXAMPLE II

A procedure similar to that described in Example 1 is followed up to the point where the ham is coated. In this example the ham is coated with 3% (w/w) natural oat fiber.

In order to achieve a regular coating and to allow an easy and clean removal of the coating after treatment, the coating is performed by entrapping, i.e., "sandwiching", the oat fiber between two layers of micro-perforated polyethylene film in a shape of a flat bag in which the ham thereafter is wrapped. This technique can be used with any kind of powders or fibers with absorbing abilities in order to eliminate a step of swelling and gel formation which assists removal of the coating.

The ham then is rolled in the absorbent bag and packed in a pack which is vacuum sealed. The packed ham is stored at 5° C. for 24 hours. Then the ham is removed from the pack and the oat fiber bag. The ham is sliced and then gas-packed in a pack.

With this treatment, 6% moisture is removed from the cooked ham before slicing and packing. The gas-packed packages are free from visible drip. The measured drip averages 0.25% (w/w) which compares to 2.5% (w/w) for a reference product treated in the same way except for the coating of oat fiber.

As will be appreciated, various modifications of the foregoing invention may be made without departing from the spirit and scope of the disclosure, and the invention may be practiced suitably in the absence of elements not specifically disclosed herein.

I claim:

1. A process for treating meat comprising placing a particulate food-acceptable water-absorbing material in contact with a cooked meat to coat the meat with the material, chilling the coated meat at least at a refrigeration temperature and maintaining the material in contact with the meat for at least a time sufficient so that free unbound water is removed from the meat and absorbed into the coating material thereby providing a water-containing coating material which coats the meat and then heating the previously chilled coated meat to swell the water-containing coating material to obtain a surface-pasteurized coated meat having a swollen coating material.

2. A process according to claim 1 wherein the coated meat is chilled to a temperature of from about −10° C. to about 10° C.

3. A process according to claim 1 further comprising chilling the surface-pasteurized coated meat having the swollen coating material to at least a refrigeration temperature.

4. A process according to claim 3 further comprising, after chilling the surface-pasteurized meat having the swollen coating material, removing at least a portion of the swollen coating material from the surface-pasteurized meat to obtain a treated meat product from which at least a part of the swollen coating material has been removed.

5. A process according to claim 4 further comprising packing the treated meat product.

6. A process according to claim 5 wherein the treated meat product is vacuum packed.

7. A process according to claim 1 further comprising, prior to chilling vacuum packing the coated meat in a pack to assist contact between the meat and the coating material during chilling.

8. A process according to claim 7 further comprising chilling the surface-pasteurized coated meat having the swollen coating material to at least a refrigeration temperature.

9. A process according to claim 8 further comprising, after chilling the surface-pasteurized coated meat having the swollen coating material, removing the coated meat from the pack and then packing the coated meat.

10. A process according to claim 8 further comprising, after chilling the surface-pasteurized coated meat having the swollen coating material, removing the coated meat from the pack and then removing at least a portion of the swollen coating material from the coated meat to obtain a treated meat product from which at least a part of the swollen coating material has been removed.

11. A process according to claim 10 further comprising packing the treated meat product.

12. A method according to claim 11 wherein the treated meat product is vacuum packed.

13. A process according to claim 1 wherein the material is coated on the meat in an amount of from 0.25% to 10% by weight based on a weight of the meat.

14. A process according to claim 1 wherein the material has a particle size of from 0.01 mm to 0.05 mm.

15. A method according to claim 1 wherein the material is edible.

16. A process according to claim 1 wherein the absorbing material is selected from the group consisting of animal fibers, vegetable fibers, proteins, starch and edible gums.

17. A process according to claim 1 wherein the meat is ham.

18. A process according to claim 1 wherein the meat is a marinated meat.

* * * * *

UNITED STATES PATENT AND TRADEMARK OFFICE
CERTIFICATE OF CORRECTION

PATENT NO. : 5,262,188
DATED : November 16, 1993
INVENTOR(S) : Jacques NOCQUET

It is certified that error appears in the above-identified patent and that said Letters Patent is hereby corrected as shown below:

Colun 6, line 8 (line 2 of claim 7), insert a comma after "chilling".

Signed and Sealed this

Nineteenth Day of April, 1994

Attest:

BRUCE LEHMAN

Attesting Officer

Commissioner of Patents and Trademarks